United States Patent
Zhang

(10) Patent No.: US 10,503,607 B2
(45) Date of Patent: Dec. 10, 2019

(54) METHOD AND APPARATUS FOR GENERATING VIRTUAL MACHINE SNAPSHOT

(71) Applicant: Huawei Technologies Co., Ltd., Shenzhen (CN)

(72) Inventor: Hailiang Zhang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 9 days.

(21) Appl. No.: 15/991,858

(22) Filed: May 29, 2018

(65) Prior Publication Data

US 2018/0276081 A1    Sep. 27, 2018

Related U.S. Application Data

(63) Continuation of application No. PCT/CN2016/079882, filed on Apr. 21, 2016.

(30) Foreign Application Priority Data

Nov. 30, 2015    (CN) .......................... 2015 1 0863046

(51) Int. Cl.
*G06F 11/14*    (2006.01)
*G06F 9/455*    (2018.01)
(Continued)

(52) U.S. Cl.
CPC .......... *G06F 11/1451* (2013.01); *G06F 9/455* (2013.01); *G06F 9/45558* (2013.01);
(Continued)

(58) Field of Classification Search
USPC ........................................................ 711/162
See application file for complete search history.

(56) References Cited

U.S. PATENT DOCUMENTS 7,093,086 B1 *  8/2006  van Rietschote ... G06F 11/1438
                                                    711/161
7,840,963 B2 * 11/2010  Traut .................. G06F 11/1438
                                                    711/161
(Continued)

FOREIGN PATENT DOCUMENTS

CN    101609419 A    12/2009
CN    102520881 A     6/2012
(Continued)

OTHER PUBLICATIONS

Machine Translation and Abstract of Chinese Publication No. CN101609419, dated Dec. 23, 2009, 19 pages.
(Continued)

*Primary Examiner* — Mano Padmanabhan
*Assistant Examiner* — Jean C Edouard
(74) *Attorney, Agent, or Firm* — Conley Rose, P.C.

(57) ABSTRACT

A method and an apparatus for generating a virtual machine snapshot, where the method includes suspending a virtual machine at a first moment according to a received snapshot command, starting to perform a storage operation on a memory page in memory of the virtual machine and a contamination interception operation on the memory page in the memory, storing a device status, which is at the first moment, of the virtual machine to a snapshot file, and restoring the virtual machine from a suspended state to a running state after the device status is stored.

19 Claims, 8 Drawing Sheets

(51) Int. Cl.
*G06F 12/14* (2006.01)
*G06F 12/1009* (2016.01)

(52) U.S. Cl.
CPC .......... *G06F 11/14* (2013.01); *G06F 12/1009* (2013.01); *G06F 12/1441* (2013.01); *G06F 2009/4557* (2013.01); *G06F 2009/45575* (2013.01); *G06F 2009/45583* (2013.01); *G06F 2009/45591* (2013.01); *G06F 2201/84* (2013.01); *G06F 2212/1024* (2013.01); *G06F 2212/152* (2013.01)

(56) References Cited

U.S. PATENT DOCUMENTS

| | | | | |
|---|---|---|---|---|
| 9,524,389 | B1* | 12/2016 | Roth | G06F 21/554 |
| 9,645,847 | B1* | 5/2017 | Roth | G06F 9/45533 |
| 2010/0049929 | A1* | 2/2010 | Nagarkar | G06F 9/45533 |
| | | | | 711/162 |
| 2010/0228913 | A1* | 9/2010 | Czezatke | G06F 11/1451 |
| | | | | 711/112 |
| 2011/0113206 | A1* | 5/2011 | Heim | G06F 9/4418 |
| | | | | 711/162 |
| 2014/0075141 | A1* | 3/2014 | Nicholas | G06F 9/4418 |
| | | | | 711/162 |
| 2014/0196034 | A1* | 7/2014 | Amano | G06F 9/45533 |
| | | | | 718/1 |
| 2014/0244950 | A1 | 8/2014 | Baron et al. | |
| 2014/0245291 | A1* | 8/2014 | Tsirkin | G06F 9/45558 |
| | | | | 718/1 |
| 2015/0066859 | A1* | 3/2015 | Blake | G06F 11/1438 |
| | | | | 707/649 |
| 2015/0154081 | A1* | 6/2015 | Javadekar | G06F 11/2097 |
| | | | | 707/639 |
| 2016/0179419 | A1* | 6/2016 | Yamaguchi | G06F 3/0619 |
| | | | | 711/162 |

FOREIGN PATENT DOCUMENTS

| | | |
|---|---|---|
| CN | 103678040 A | 3/2014 |
| CN | 104572248 A | 4/2015 |
| CN | 104598293 A | 5/2015 |
| CN | 105224391 A | 1/2016 |
| CN | 105446834 A | 3/2016 |

OTHER PUBLICATIONS

Machine Translation and Abstract of Chinese Publication No. CN102520881, dated Jun. 27, 2012, 12 pages.
Machine Translation and Abstract of Chinese Publication No. CN103678040, dated Mar. 26, 2014, 12 pages.
Machine Translation and Abstract of Chinese Publication No. CN104572248, dated Apr. 29, 2015, 7 pages.
Machine Translation and Abstract of Chinese Publication No. CN104598293, dated May 6, 2015, 12 pages.
Machine Translation and Abstract of Chinese Publication No. CN105224391, dated Jan. 6, 2016, 9 pages.
Machine Translation and Abstract of Chinese Publication No. CN105446834, dated Mar. 30, 2016, 25 pages.
Arcangeli, A., et al., "[PATCH 00/17] RFC: userfault v2," Oct. 3, 2014, 3 pages.
Foreign Communication From a Counterpart Application, Chinese Application No. 201510863046.0, Chinese Office Action dated Jan. 8, 2018, 6 pages.
Foreign Communication From a Counterpart Application, PCT Application No. PCT/CN2016/079882, English Translation of International Search Report dated Aug. 26, 2016, 2 pages.
Foreign Communication From a Counterpart Application, PCT Application No. PCT/CN2016/079882, English Translation of Written Opinion dated Aug. 26, 2016, 6 pages.
Cui, L., et al., "HotSnap: A Hot Distributed Snapshot System for Virtual Machine Cluster," XP061014888, USENIX, Nov. 3-8, 2013, pp. 59-73.
Foreign Communication From a Counterpart Application, European Application No. 16869533.6, Extended European Search Report dated Oct. 29, 2018, 11 pages.

* cited by examiner

METHOD AND APPARATUS FOR GENERATING VIRTUAL MACHINE SNAPSHOT

CROSS-REFERENCE TO RELATED APPLICATIONS

This application is a continuation of International Patent Application No. PCT/CN2016/079882 filed on Apr. 21, 2016, which claims priority to Chinese Patent Application No. 201510863046.0 filed on Nov. 30, 2015. The disclosures of the aforementioned applications are hereby incorporated by reference in their entireties.

TECHNICAL FIELD

The present disclosure relates to the computer field, and in particular, to a method and an apparatus for generating a virtual machine snapshot.

BACKGROUND

A virtual machine snapshot means copying and storing a status, which is at a specific moment, of a virtual machine in order to restore the virtual machine according to the virtual machine snapshot when a system encounters a problem, or restore the virtual machine to a running state at the moment according to the virtual machine snapshot after the virtual machine starts. An online snapshot means storing a working status of a current virtual machine to a specified file without interrupting normal running of the current virtual machine.

The virtual machine snapshot includes a device status and memory data of the virtual machine. At present, a kernel-based virtual machine (KVM) does not have an online memory snapshot function. When a snapshot of the KVM is being obtained, the virtual machine needs to be suspended first, and then content in a virtual memory of the virtual machine and the device status are live migrated to a snapshot file. However, live migration from the memory of the virtual machine to the snapshot file takes a relatively long time, and therefore the virtual machine is suspended for a relatively long time, greatly affecting a service of the virtual machine.

SUMMARY

Embodiments of the present disclosure provide a method and an apparatus for generating a virtual machine snapshot in order to ensure consistency of memory of a virtual machine in a snapshot file, and reduce interruption of an internal service of the virtual machine as far as possible.

According to a first aspect, an embodiment of the present disclosure provides a method for generating a virtual machine snapshot. According to the method, write protection is performed on all memory pages of a virtual machine in a user mode such that all write operations on a memory page of the virtual machine are blocked in a kernel mode, a write protection exception is processed in the user mode, the memory page is stored to a snapshot file before being contaminated, and after the storage is completed, running of the virtual machine immediately resumes. Therefore, consistency of memory of the virtual machine in the snapshot file is ensured, normal running of the virtual machine is not affected as far as possible, and impact on a host machine is mitigated (which mainly means that excessive extra memory cannot be occupied).

In a first possible implementation of the first aspect, a virtual machine monitor obtains a snapshot command, suspends the virtual machine at a first moment according to the snapshot command, and stores a device status, which is at the first moment, of the virtual machine in a suspended state to the snapshot file of the virtual machine. The virtual machine is restored from the suspended state to a running state after the device status is stored. From the first moment, the virtual machine monitor further performs a storage operation on a memory page in memory of the virtual machine and a contamination interception operation on the memory page in the memory of the virtual machine.

According to the first possible implementation of the first aspect, in a second possible implementation, the contamination interception operation on the memory page in the memory of the virtual machine includes intercepting, from the first moment to a moment at which content of the memory page is stored to the snapshot file of the virtual machine, a contamination action that affects the content of the memory page, and after storing the content of the memory page to a buffer, releasing the interception on the contamination action.

According to the first or the second possible implementation of the first aspect, in a third possible implementation, the storage operation on the memory page in the memory of the virtual machine includes storing the content, stored in the buffer, of the memory page to the snapshot file of the virtual machine. According to this embodiment of the present disclosure, the buffer is used to store the memory page of the virtual machine to mitigate impact on running of the virtual machine. A user may set a size of the buffer according to an actual requirement, and a larger buffer indicates smaller impact on the running of the virtual machine.

According to any one of the first aspect or the possible implementations of the first aspect, in a fourth possible implementation, the storage operation on the memory page in the memory of the virtual machine and the contamination interception operation on the memory page in the memory are two actions that are performed in parallel after the first moment.

According to any possible implementation of the first aspect, in a fifth possible implementation, before obtaining a snapshot file of one memory page of the memory pages, a process of sequentially obtaining snapshot files of memory pages in the memory of the virtual machine includes determining whether content of the memory page has been stored to the buffer, and directly storing the content of the memory page to the snapshot file if the content of the memory page has not been stored to the buffer, or storing the content, in the buffer, of the memory page to the snapshot file of the virtual machine if the content of the memory page has been stored to the buffer. Therefore, all the memory pages of the virtual machine are stored only once, thereby ensuring that a size of the snapshot file is less than or equal to a size of the memory of the virtual machine, and reducing space occupied by the snapshot file of the memory.

Further, in a sixth possible implementation, the buffer may be memory other than the memory of the virtual machine, or may be multiple files other than the memory of the virtual machine.

According to any possible implementation of the first aspect, in a seventh possible implementation, a method for determining whether the content of the memory page has been stored to the buffer includes flagging the memory page as "contamination action intercepted" when the contamination action that affects the content of the memory page is intercepted, or flagging the memory page as "stored to the buffer" when the content of the memory page is stored to the buffer.

In the method for generating a virtual machine snapshot in this embodiment of the present disclosure, the virtual machine is restored to the running state after the snapshot file of the device status, which is at the first moment, of the virtual machine is obtained such that the virtual machine is suspended for a relatively short time, and impact on a service of the virtual machine is relatively small. When a snapshot file of the memory page of the virtual machine is being obtained, from the first moment to the moment at which the content of the memory page in the memory of the virtual machine is stored to the snapshot file of the virtual machine, the contamination action that affects the content of the memory page is intercepted, and the content of the memory page is stored to the buffer such that when the memory page of the virtual machine is being stored, the content of the memory page is obtained from the buffer and is stored to the snapshot file of the virtual machine if the memory page is a contaminated memory page. In this way, consistency of the device status and the virtual memory in the snapshot file, which is at the first moment, of the virtual machine can be ensured. In addition, after the content of the memory page is stored to the buffer, the interception on the contamination action is released such that the memory page can be successfully accessed without a need of suspending the virtual machine until the snapshot file of the virtual memory of the virtual machine has been obtained and then restoring the virtual machine to the running state. This avoids a case in which the service is affected because the virtual machine is suspended for a relatively long time.

According to any possible implementation of the first aspect, in an eighth possible implementation, a method for intercepting the contamination action on the memory page includes enabling write protection on the memory page using a userfaultfd interface to intercept the contamination action on the memory page using the write protection. Further, the memory page is flagged as read-only using the userfaultfd interface. A copy-on-write function of a LINUX userfault function on a memory page does not distinguish whether a write-protected page is modified in the kernel mode or in the user mode. In this embodiment of the present disclosure, the write protection on the memory page is enabled by invoking the userfaultfd interface without distinguishing whether the write-protected page is modified in the kernel mode or in the user mode. Therefore, kernel-driven code does not need to be modified, and compatibility with an existing virtualization platform can be implemented.

According to any possible implementation of the first aspect, in a ninth possible implementation, a method for storing the content of the memory page to the buffer includes creating a write protection exception handling thread, obtaining, by the write protection exception handling thread, a file descriptor, where optionally, the write protection exception handling thread can obtain the file descriptor using the userfaultfd interface, obtaining, by the write protection exception handling thread, an address of the memory page according to the file descriptor when the contamination action on the memory page is intercepted, and obtaining, by the write protection exception handling thread, the content of the memory page according to the address of the memory page, and storing the content to the buffer, where optionally, the write protection exception handling thread can obtain the address of the memory page by invoking a function read (ufd), the ufd is a file descriptor.

According to the ninth possible implementation of the first aspect, in a tenth possible implementation, the write protection exception handling thread may further flag the memory page as "contamination action intercepted" or "stored to the buffer". Preferably, the write protection exception handling thread can flag the memory page using a bitmap. After the write protection exception handling thread stores the content of the memory page to the buffer, the userfaultfd interface is used to instruct to remove the write protection on the memory page in the kernel mode, and the virtual machine continues running and can implement a write operation on the memory page. When content of memory pages corresponding to all addresses has been stored to the snapshot file, the write protection exception handling thread is instructed to exit.

According to any possible implementation of the first aspect, in an eleventh possible implementation, guest software and a virtual machine monitor on a virtualization platform can contaminate the memory of the virtual machine. The virtual machine monitor enables an extended page table (EPT) or nested page table (NPT) write protection function to intercept a contamination action of the guest software on the memory of the virtual machine. After the EPT or NPT write protection function is enabled, the write protection function is used to enable the virtual machine to switch from a guest state to a host state before the guest software contaminates the memory page, and the virtual machine monitor stores, in the host state, the content of the memory page to the buffer, flags the memory page as "contamination action intercepted" or "stored to the buffer", and then removes the write protection on the memory page such that the guest software can successfully implement the write operation on the memory page.

According to the eleventh possible implementation of the first aspect, in a twelfth possible implementation, the virtual machine monitor can distinguish, according to a code execution path of the virtual machine monitor, whether the virtual machine monitor is to write the memory of the virtual machine. When the virtual machine monitor determines, according to the code execution path, that the memory of the virtual machine is to be contaminated, the virtual machine monitor determines whether the snapshot file of the virtual machine is being obtained currently. Further, the virtual machine monitor enables a write action track function when receiving the snapshot command. When the write action track function is enabled, the virtual machine monitor may determine that the snapshot file of the virtual machine is being obtained currently. When the snapshot file of the virtual machine is being obtained currently, and that content of a memory page to be contaminated has not been stored to the buffer, the virtual machine monitor stores the content of the memory page to the buffer, and then contaminates the memory page.

According to a second aspect, an embodiment of the present disclosure further provides an apparatus for generating a virtual machine snapshot configured to implement the foregoing method.

In a first possible implementation of the second aspect, the apparatus for generating a virtual machine snapshot includes an obtaining module, a first storage module, an interception module, a second storage module, and a restoration module, where each module implements a specific function, and the modules cooperate to implement the method for generating a virtual machine snapshot that is provided in the first aspect and the first to the twelfth possible implementations of the first aspect.

In a second possible implementation of the second aspect, the apparatus for generating a virtual machine snapshot is a virtual machine monitor, where the virtual machine monitor includes a Quick Emulator (QEMU) process in a user mode and a KVM module in a kernel mode, and the QEMU process is used to perform the method for generating a virtual machine snapshot that is provided in the first aspect and the first to the twelfth possible implementations of the first aspect.

According to a third aspect, an embodiment of the present disclosure further provides a computer readable storage medium, where the storage medium stores an instruction or a software module used to implement the method for generating a virtual machine snapshot that is described in the first aspect and the first to the twelfth possible implementations of the first aspect.

In the embodiments of the present disclosure, from the first moment to the moment at which the content of the memory page in the memory of the virtual machine is stored to the snapshot file of the virtual machine, the contamination action that affects the content of the memory page is intercepted, and the content of the memory page is stored to the buffer such that when the memory page of the virtual machine is being stored, if it is detected that the content of the memory page is stored to the buffer, the content of the memory page is obtained from the buffer and the content is stored to the snapshot file of the virtual machine. In this way, consistency of the device status and the virtual memory in the snapshot file, which is at the first moment, of the virtual machine can be ensured. In addition, after the content of the memory page is stored to the buffer, the interception on the contamination action is released such that the memory page can be successfully accessed without a need of suspending the virtual machine until the snapshot file of the virtual memory of the virtual machine has been obtained and then restoring the virtual machine to the running state. This shortens a suspension time of the virtual machine, and further mitigates impact on a service carried by the virtual machine.

DESCRIPTION OF EMBODIMENTS

To make persons skilled in the art better understand the solutions of the present disclosure, the following clearly describes the technical solutions in the embodiments of the present disclosure with reference to the accompanying drawings in the embodiments of the present disclosure. The described embodiments are merely some but not all of the embodiments of the present disclosure. All other embodiments obtained by persons of ordinary skill in the art based on the embodiments of the present disclosure without creative efforts shall fall within the protection scope of the present disclosure.

In the specification, claims, and accompanying drawings of the present disclosure, the terms "first", "second", "third", "fourth", and so on are intended to distinguish between different objects but do not describe a particular order. In addition, the terms "including", "having", or any other variant thereof, are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

Figure 1:
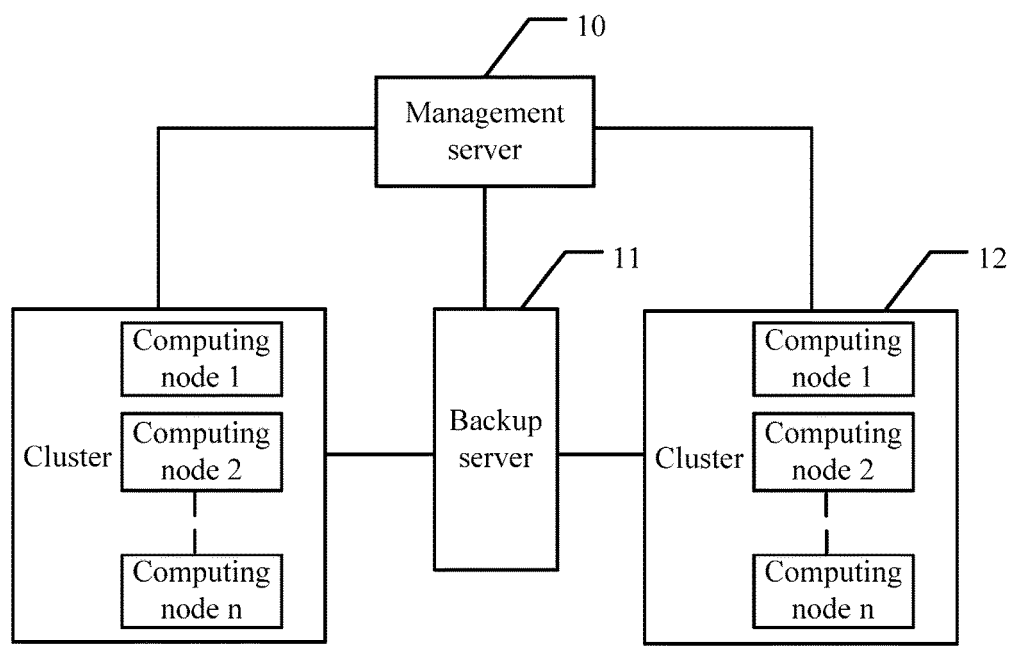
FIG. 1 is a simplified deployment diagram of a data center according to an embodiment of the present disclosure.

A method for generating a virtual machine snapshot that is provided in an embodiment of the present disclosure may be typically used in a backup and recovery scenario of a data center. FIG. 1 shows a simplified deployment diagram of the data center.

Referring to FIG. 1, the data center includes multiple clusters (two clusters are used as an example in FIG. 1), and each cluster includes multiple computing nodes (or referred to as hosts), for example, a cluster 12 in FIG. 1 includes computing nodes 1-n. Each computing node includes computer software (a virtualization platform) and hardware (including computing hardware, such as x86, an Advanced reduced instruction set computing (RISC) Machine (ARM), storage hardware, and network hardware), and multiple virtual machines are allowed to run on each computing node. In addition, the data center further has a management server 10 (which may be considered as a management node), and a backup server 11 (there may be multiple backup servers), and the backup server 11 usually has a large-capacity storage device. As shown in FIG. 1, the management server 10 delivers a backup command for a virtual machine of a cluster, a computing node takes a snapshot of the specified virtual machine, and corresponding snapshot data is stored to the backup server. Using a snapshot file, the virtual machine can be restored or a new virtual machine can be created on an original cluster node when needed. Alternatively, cross-site backup data recovery may be used, that is, virtual machine snapshot data of a site can be transferred to another site, and recovered to any virtual machine. A virtual machine snapshot means storing a status of a virtual machine at a moment like a photo. Usually, a snapshot stores all hard disk information, memory information, and central processing unit (CPU) information, and some virtual machine snapshots further store Basic Input/Output System (BIOS) information. A snapshot is usually divided into two main parts, a magnetic disk snapshot and a virtual machine status snapshot (also referred to as a virtual machine memory snapshot because content of most snapshot files is memory data). The magnetic disk snapshot may be independently used, and the virtual machine status snapshot generally needs to be used with the magnetic disk snapshot. The method for generating a virtual machine snapshot in the present disclosure is used to store a working status of one or multiple virtual machines in a computing node to a specified file without interrupting normal running of a current virtual machine, and belongs to an online snapshot technology.

The following describes the method for generating a virtual machine snapshot in the present disclosure using a computing node as an example. The computing node may be a server, or a hardware device having an operation processing capability. A schematic diagram of an internal structure of the computing node is shown in FIG. 2.

Figure 2:
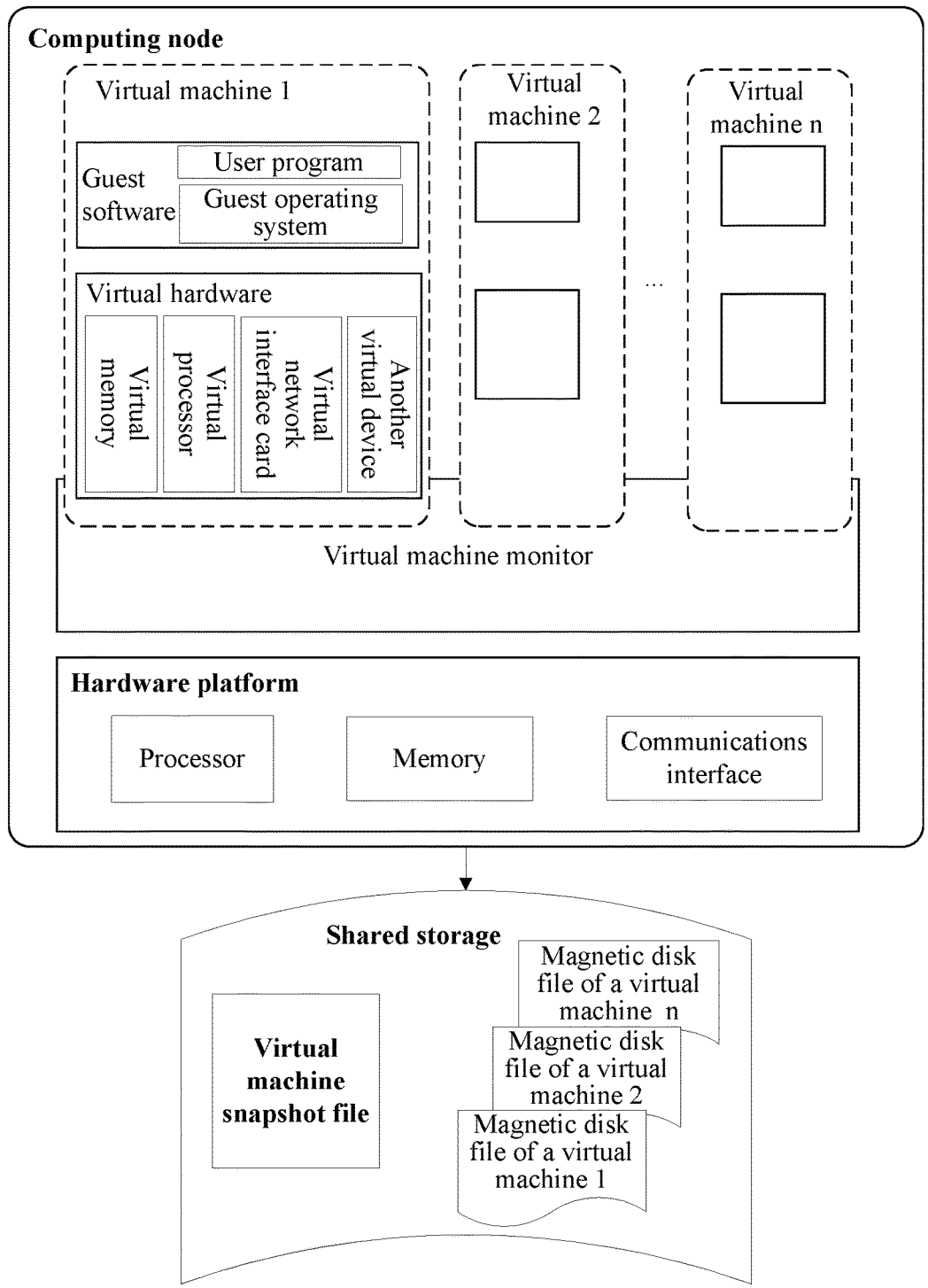
FIG. 2 is a schematic structural block diagram of a computing node in the data center shown in FIG. 1.

As shown in FIG. 2, FIG. 2 is a schematic structural block diagram of a computing node according to an embodiment of the present disclosure. A hardware platform of the computing node includes a processor, a memory, a communications interface, and the like. The memory may include a volatile memory (such as a random access memory (RAM)) and an optional nonvolatile memory (such as a magnetic disk or a solid state drive (SSD)). Components on the hardware platform may be connected using a bus to implement information exchange between the components. The hardware platform may alternatively be distributed on different physical entities, and when the hardware platform is located in different physical entities, the information exchange between the components may be implemented using a communications interface on each computing node. Optionally, the computing node may communicate with a shared storage device using the communications interface.

A virtual machine monitor runs on the hardware platform of the computing node. The virtual machine monitor is configured to mask a hardware difference of a hardware platform to provide a user with multiple abstract, unified, and simulated computing environments, that is, multiple virtual machines. The virtual machine monitor simulates, for each virtual machine, a virtual hardware environment independent of real physical hardware. The virtual machine includes virtual hardware and guest software. The virtual hardware includes virtual memory, a virtual processor, a virtual network interface card, and another virtual device. The guest software includes a user program and a guest operating system. The guest operating system may be WINDOWS, LINUX, SOLARIS, or the like. This is not limited herein.

On some platforms, the virtual machine monitor is an operating system, for example, in a KVM, the virtual machine monitor is a host operating system.

Further, for example, in the KVM, the virtual machine monitor includes a QEMU process in a user mode and a KVM module in a kernel mode. The QEMU process is used to simulate the virtual network interface card and another virtual device of the virtual machine. The KVM module assists the QEMU process, and makes full use of a hardware virtualization capability to simulate the memory and the processor of the virtual machine.

A snapshot of the virtual machine is used to back up and recover the virtual machine. In FIG. 1, the management server 10 delivers a backup command for a virtual machine of a cluster. When receiving a snapshot instruction, the virtual machine monitor obtains status data of the virtual machine according to the snapshot instruction, and stores the status data to a snapshot file. The snapshot file of the virtual machine includes device status data of the virtual machine and virtual memory data of the virtual machine. For ease of description, "virtual memory of the virtual machine" is referred to as "memory of the virtual machine" in the following. During deployment of a cluster system, a shared storage is usually used to store a magnetic disk file and a snapshot file of each virtual machine in a server to facilitate centralized management. Certainly, the snapshot file of the virtual machine may alternatively be stored to a nonvolatile memory of the server. This is not limited herein.

When the snapshot file of the virtual machine is being obtained, consistency of a device status snapshot and a virtual memory snapshot of the virtual machine needs to be ensured, that is, the device status data and the memory data of the virtual machine need to be the same as device status data and memory data, which are at a specific moment, of the virtual machine respectively in order to back up and/or restore the virtual machine according to the snapshot file of the virtual machine subsequently.

For example, according to a snapshot file, which is at a first moment, of the virtual machine, the virtual machine can be restored to a status at the first moment, or a new virtual machine is additionally created on a node in the cluster or on a node in another cluster, and the new virtual machine is enabled to have the status, which is at the first moment, of the virtual machine according to the snapshot file, which is at the first moment, of the virtual machine.

Figure 3:
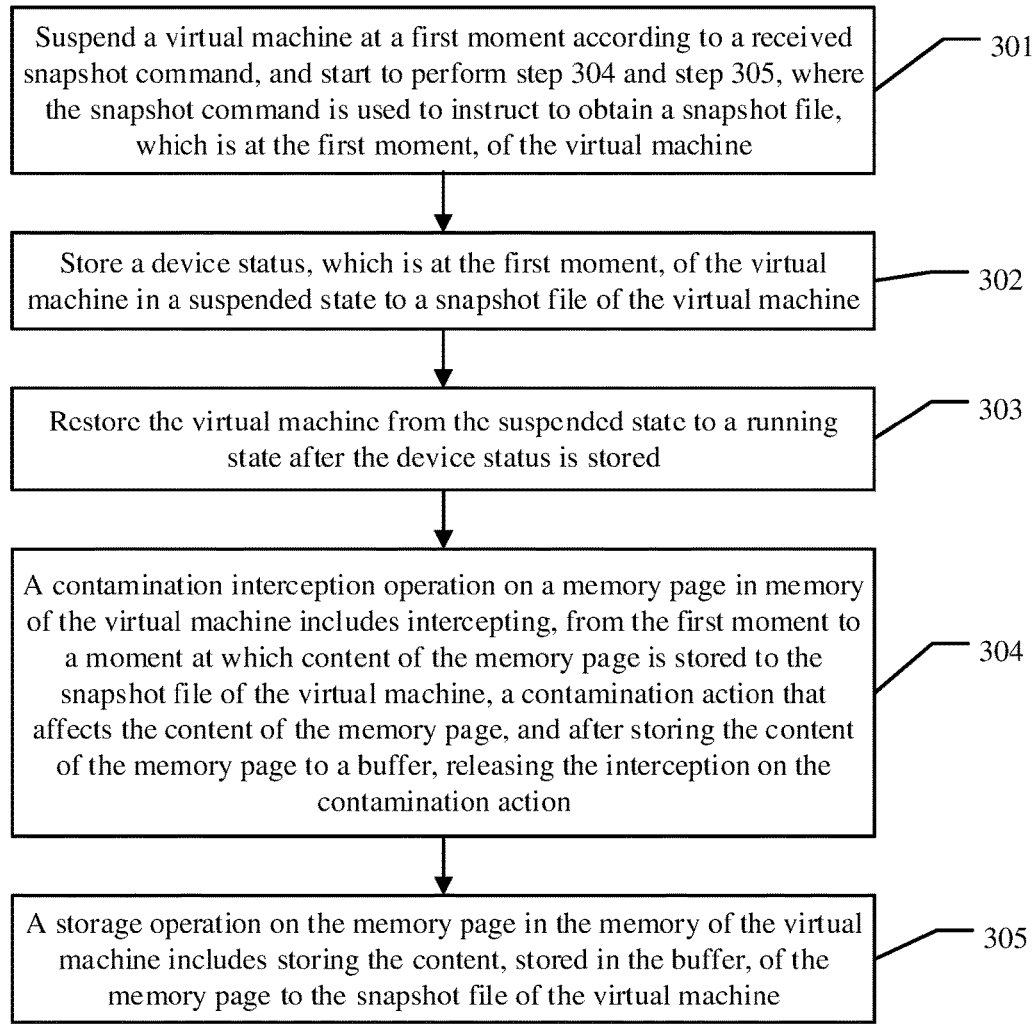
FIG. 3 is a schematic flowchart of an embodiment of a method for generating a virtual machine snapshot according to the present disclosure.

FIG. 3 is a schematic flowchart of an embodiment of a method for generating a virtual machine snapshot according to the present disclosure. As shown in FIG. 3, the method for generating a virtual machine snapshot includes the following steps.

Step 301. A virtual machine monitor suspends a virtual machine at a first moment according to a received snapshot command, and starts to perform step 304 and step 305, where the snapshot command is used to instruct to obtain a snapshot file, which is at the first moment, of the virtual machine.

In an embodiment, the snapshot command carries information used to indicate the virtual machine, and is used to instruct to obtain the snapshot file of the virtual machine. After receiving the snapshot command, the virtual machine monitor immediately responds to the snapshot command, and obtains a snapshot file, which is at a moment at which the snapshot command is received, of the virtual machine. For ease of description, a moment at which the virtual machine monitor responds to the snapshot command after receiving the snapshot command is referred to as the first moment. It should be noted that the moment at which the virtual machine monitor responds to the snapshot command is the same as the moment at which the snapshot command is received, but there may be a delay from the moment at which the virtual machine monitor receives the snapshot command to the moment at which the virtual machine monitor responds to the snapshot command.

After receiving the snapshot command, the virtual machine monitor suspends the virtual machine at the first moment according to the snapshot command, and starts to perform a storage operation on a memory page in memory of the virtual machine and a contamination interception operation on the memory page in the memory of the virtual machine from the first moment. The contamination interception operation on the memory page in the memory of the virtual machine is explained in step 304, and the storage operation on the memory page in the memory of the virtual machine is explained in step 305.

Step 302. The virtual machine monitor stores a device status, which is at the first moment, of the virtual machine in a suspended state to the snapshot file of the virtual machine.

Because the virtual machine is suspended at the first moment, the snapshot file of the virtual machine is obtained by the virtual machine monitor includes the suspended device state, which is at the first moment, of the virtual machine. How to obtain the snapshot file of the device status belongs to other approaches, and details are not described herein.

Step 303. The virtual machine monitor restores the virtual machine from the suspended state to a running state after the device status is stored.

There are a relatively large quantity of memory pages in the memory of the virtual machine, and it takes a relatively long time for the virtual machine monitor to obtain snapshot files of all the memory pages in the memory of the virtual machine. Therefore, if the virtual machine is restored to the running state after all the snapshot files of the memory of the virtual machine are obtained, the virtual machine may be suspended for a relatively long time, and impact on a service of the virtual machine is relatively large. Therefore, in this embodiment, the virtual machine monitor restores the virtual machine to the running state after obtaining the snapshot file of the device status, which is at the first moment, of the virtual machine such that the virtual machine is suspended for a relatively short time, and the impact on the service of the virtual machine is relatively small.

Step 304. A contamination interception operation performed by the virtual machine monitor on a memory page in memory of the virtual machine includes intercepting, from the first moment to a moment at which content of the memory page is stored to the snapshot file of the virtual machine, a contamination action that affects the content of the memory page, and after storing the content of the memory page to a buffer, releasing the interception on the contamination action.

Step 305. A storage operation performed by the virtual machine monitor on the memory page in the memory of the virtual machine includes storing the content, stored in the buffer, of the memory page to the snapshot file of the virtual machine.

In this specification, the contamination action on the memory page is a write action on the memory page. From the first moment, memory content of the virtual machine is consistent with memory content at the first moment, provided that memory pages in the memory of the virtual machine are not contaminated. However, because it takes a relatively long time to complete a memory snapshot of the virtual machine, some memory pages in the memory of the virtual machine may be contaminated.

Therefore, in the embodiment shown in FIG. 3, snapshot files of the memory pages are sequentially obtained from the first moment, and for any memory page in the memory of the virtual machine, if a contamination action that affects content of the memory page occurs before the content of the memory page is stored to the snapshot file of the virtual machine, the contamination action that affects the content of the memory page is intercepted. When the contamination action on the memory page is intercepted, the content of the memory page is stored to the buffer, and then the interception on the contamination action is released. An entity for performing the contamination action initiates the contamination action again, and successfully performs a write operation on the memory page. In this way, the content, stored in the buffer, of the memory page is content, which is at the first moment, of the memory page. After a moment at which the content of the memory page is stored to the snapshot file of the virtual machine, the interception operation on the contamination action on the memory page no longer needs to be performed.

In the embodiment shown in FIG. 3, the storage operation on the memory page in the memory of the virtual machine and the contamination interception operation on the memory page in the memory are two parallel actions after the first moment. During a process of sequentially obtaining the snapshot files of the memory pages in the memory of the virtual machine, before a snapshot file of one memory page of the memory pages is obtained, whether content of the memory page has been stored to the buffer is determined first. If the content of the memory page has not been stored to the buffer, it indicates that the memory page has not been contaminated from the first moment to a current moment, and therefore, the content of the memory page is directly stored to the snapshot file. If the content of the memory page has been stored to the buffer, it indicates that the memory page has been contaminated from the first moment to a current moment, and then the content of the memory page in the memory is not stored to the snapshot file of the virtual machine, but instead, the buffer is searched for the content of the memory page, and the content, in the buffer, of the memory page is stored to the snapshot file of the virtual machine.

The buffer may be memory other than the memory of the virtual machine, or may be multiple files other than the memory of the virtual machine. This is not limited herein.

There are multiple methods for determining whether the content of the memory page has been stored to the buffer. For example, from the first moment to a moment at which the snapshot file of the memory page is stored, the memory page is flagged as "contamination action intercepted" when the contamination action that affects the content of the memory page is intercepted, or the memory page is flagged as "stored to the buffer" when the content of the memory page is stored to the buffer.

In this way, before the snapshot files of the memory pages of the virtual machine are sequentially obtained, when it is detected that the memory page is flagged as "contamination action intercepted" or "stored to the buffer", it indicates that the memory page has been contaminated, that is, current content of the memory page is inconsistent with the content at the first moment, and then the current content of the memory page is not stored to the snapshot file of the virtual machine, but instead, the content of the memory page (that is, the content at the first moment) is obtained from the buffer, and the obtained content is stored to the snapshot file of the virtual machine.

That the memory page is flagged as "contamination action intercepted" or "stored to the buffer" is as follows, where an address of the memory page is flagged as "contamination action intercepted" or "stored to the buffer". When content of a memory page of the virtual machine is being stored to the snapshot file of the virtual machine, an address of the memory page is obtained, it is detected whether the address of the memory page is flagged, and if the address of the memory page is not flagged, the content of the memory page is obtained according to the address of the memory page and is stored to the snapshot file of the virtual machine.

In the embodiment shown in FIG. 3, for any memory page in the memory of the virtual machine, from the first moment to a moment at which content of the memory page is stored to the snapshot file of the virtual machine, a contamination action that affects the content of the memory page is intercepted, and the content of the memory page is stored to the buffer such that when the memory page of the virtual machine is being stored, if it is detected that the content of the memory page has been stored to the buffer, the content of the memory page is obtained from the buffer, and the content is stored to the snapshot file of the virtual machine. In this way, consistency of the device status and the virtual memory in the snapshot file, which is at the first moment, of the virtual machine can be ensured. In addition, after the content of the memory page is stored to the buffer, the interception on the contamination action is released such that the memory page can be successfully accessed without a need of suspending the virtual machine until the snapshot file of the virtual memory of the virtual machine has been obtained and then restoring the virtual machine to the running state. This avoids a case in which the service is affected because the virtual machine is suspended for a relatively long time. In addition, in this embodiment, the buffer is used to store the content of the memory page of the virtual machine, and therefore, a user may set a size of the buffer according to an actual requirement.

In the embodiment shown in FIG. 3, there are multiple methods for intercepting the contamination action on the memory page, and the following uses two of the methods as examples for description.

Example 1

Write protection on the memory page is enabled using a userfaultfd interface to intercept the contamination action on the memory page using the write protection.

Further, the memory page is flagged as read-only using the userfaultfd interface. In this embodiment, after the contamination action on the memory page is intercepted, the content of the memory page needs to be stored to the buffer. The following describes, using an example, a method for storing the content of the memory page to the buffer.

The method includes creating a write protection exception handling thread, obtaining, by the write protection exception handling thread, a file descriptor, where the write protection exception handling thread can obtain the file descriptor using the userfaultfd interface, obtaining, by the write protection exception handling thread, an address of the memory page according to the file descriptor when the contamination action on the memory page is intercepted, obtaining, by the write protection exception handling thread, the content of the memory page according to the address of the memory page, and storing the content to the buffer.

The file descriptor is used for communication between a kernel mode and a user mode. After the write protection exception handling thread is created, because the memory pages are in a write protection state, when a memory page is to be contaminated, a page fault occurs in the kernel mode, the contamination action is blocked in the kernel mode, and at the same time, the write protection exception handling thread in the user mode is notified of an address of the memory page using the file descriptor. The write protection exception handling thread obtains content of the memory page according to the address of the memory page, and stores the content of the memory page to the buffer.

In addition, the write protection exception handling thread may further flag the memory page as "contamination action intercepted" or "stored to the buffer". After the write protection exception handling thread stores the content of the memory page to the buffer, the userfaultfd interface is used to instruct to remove the write protection on the memory page in the kernel mode. When attempting to contaminate the memory page again, the virtual machine monitor successfully implements the contamination, and continues running.

In Example 1, the write protection on the memory page is enabled by invoking the userfaultfd interface, whether a write-protected page is modified in the kernel mode or in the user mode does not need to be distinguished. Therefore, kernel-driven code does not need to be modified, and compatibility with an existing virtualization platform can be implemented.

For ease of understanding, the following describes the method in Example 1 using a specific embodiment.

Figure 4A:
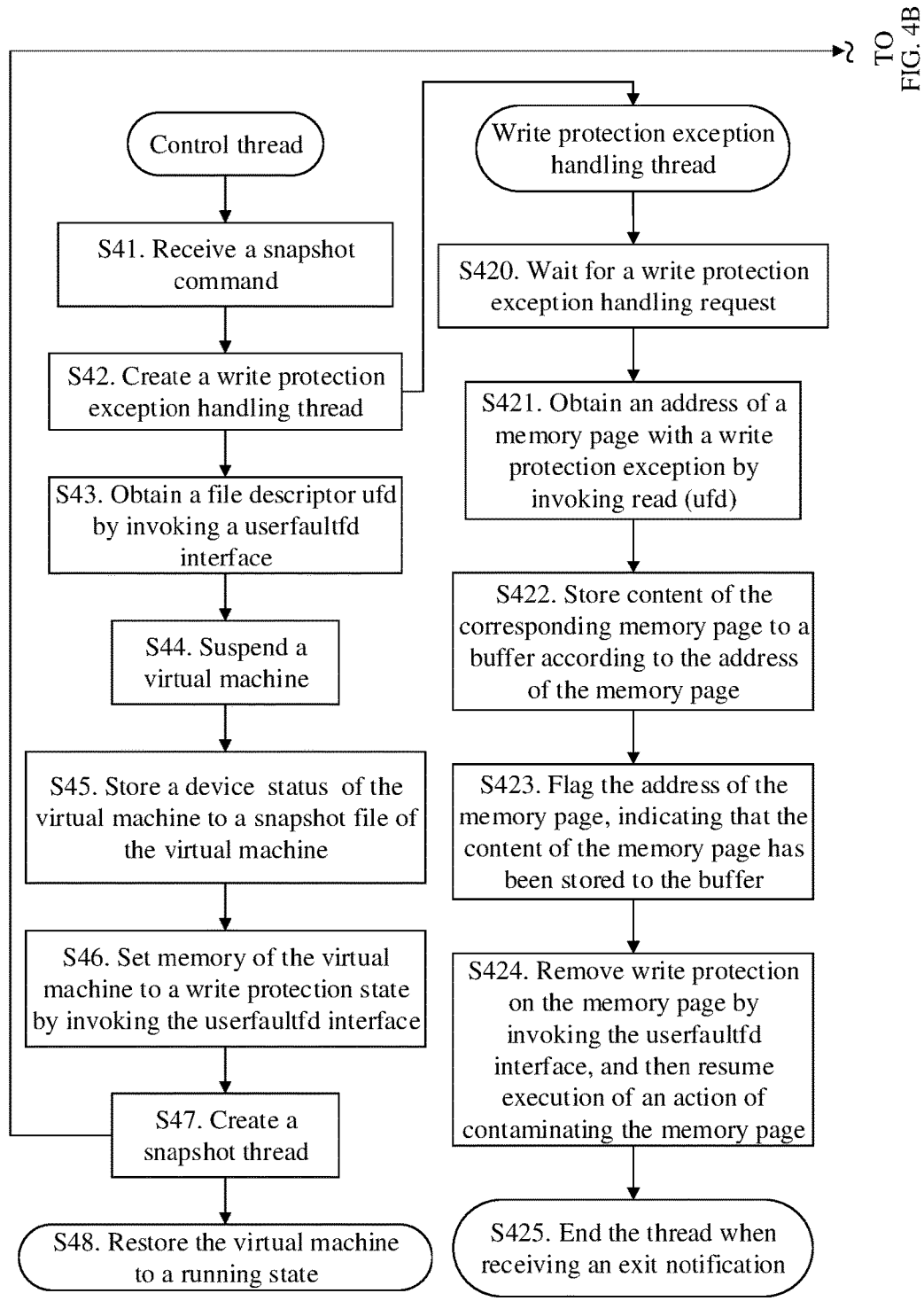
FIG. 4A and FIG. 4B are a schematic flowchart of another embodiment of a method for generating a virtual machine snapshot according to the present disclosure.
Figure 4B:
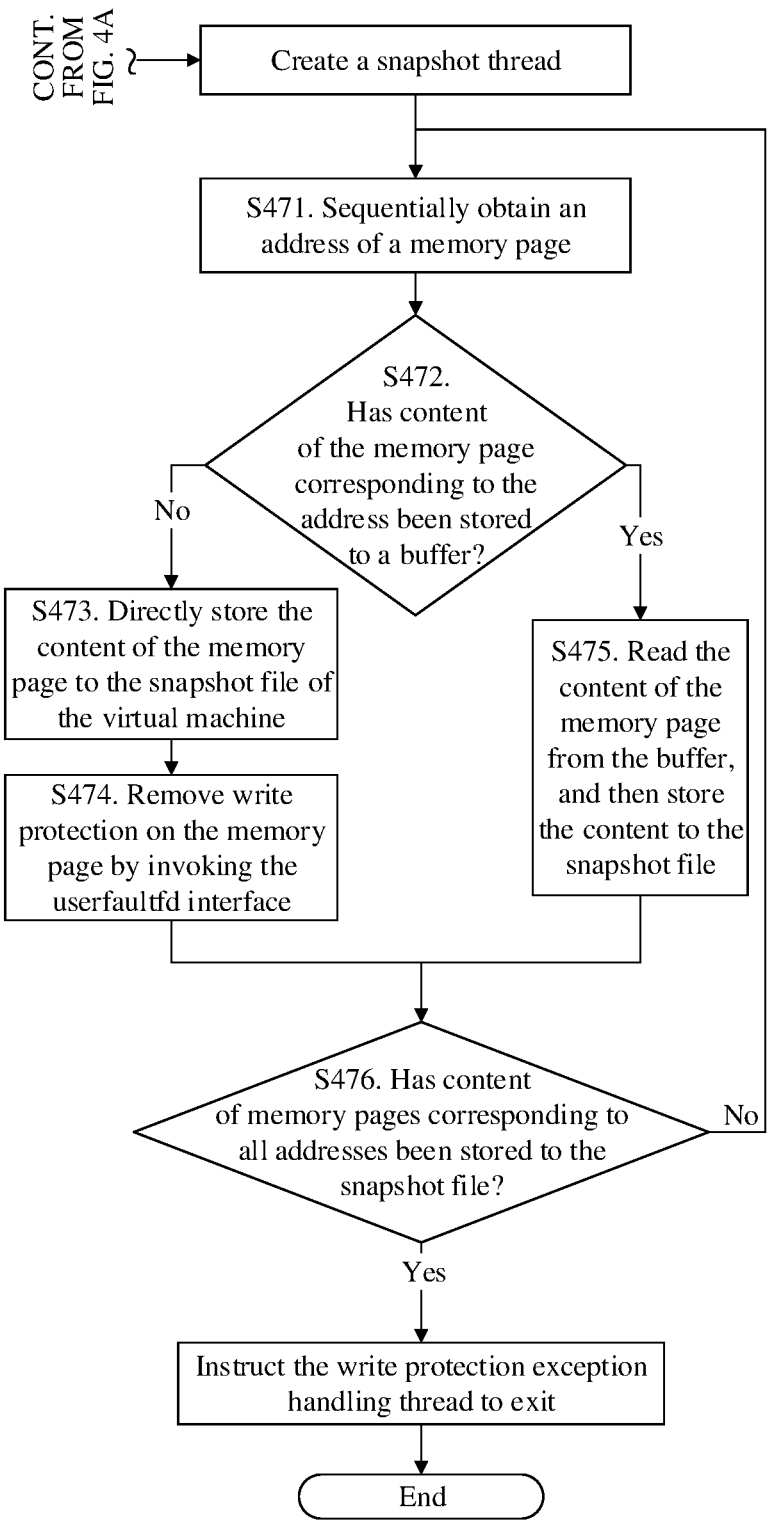

As shown in FIG. 4A and FIG. 4B, FIG. 4A and FIG. 4B are a schematic flowchart of an embodiment of a method for generating a virtual machine snapshot according to the present disclosure.

Step S41. A control thread in a virtual machine monitor receives a snapshot command.

In this embodiment, the snapshot command is used to instruct to obtain a snapshot, which is at a first moment, of a virtual machine. Further, the control thread may be a QEMU thread in the virtual machine monitor.

Step S42. The control thread creates a write protection exception handling thread.

Step S43. The write protection exception handling thread obtains a file descriptor ufd by invoking a userfaultfd interface.

Step S44. The control thread suspends the virtual machine.

Further, the control thread suspends the virtual machine at the first moment. It should be noted that both step S44 and step S42 are performed after step S41, and have no sequential order.

Step S45. The control thread stores a device status of the virtual machine to a snapshot file of the virtual machine.

Because the virtual machine is suspended at the first moment, the obtained device status of the virtual machine is the same as a device status at the first moment.

Step S46. The control thread sets write protection on memory of the virtual machine by invoking the userfaultfd interface.

It should be noted that step S45 and step S46 have no sequential order.

Step S47. The control thread creates a snapshot thread.

It should be noted that step S47 is performed after step S44 and step S46, and step S47 and step S45 have no certain sequential order.

Step S48. The control thread restores the virtual machine to a running state.

In the embodiment shown in FIG. 4A and FIG. 4B, the following steps are performed by the write protection exception handling thread in step S42.

Step S420. The write protection exception handling thread waits for a write protection exception handling request.

After the control thread enables the write protection on the memory of the virtual machine using the userfaultfd interface, when a memory page is to be contaminated, a page fault occurs in a kernel mode, the contamination action is blocked, and then the write protection exception handling thread is notified of an address of the memory page using the file descriptor. In this embodiment, the write protection exception handling request means that the write protection exception handling thread is notified, in the kernel mode, of the address of the memory page to be contaminated.

Step S421. The write protection exception handling thread obtains an address of a memory page with a write protection exception by invoking read (ufd).

When the write protection exception handling thread is notified, in the kernel mode, of the address of the memory page to be contaminated, the write protection exception handling thread obtains the address of the memory page by invoking the read (ufd).

Step S422. The write protection exception handling thread stores content of the memory page to a buffer according to the address of the memory page.

Step S423. The write protection exception handling thread flags the memory page as "contamination action intercepted" or "stored to the buffer".

There are multiple methods for flagging the memory page. For example, a bitmap may be used to flag the memory page. For example, a variable userfault_bitmap may be defined, and each bit of the variable corresponds to an address of a memory page of the virtual machine. Further, according to any bit in the variable, an address of a memory page corresponding to the bit may be calculated. An initial value of a corresponding bit, of each memory page, in the userfault_bitmap is 0. After the write protection exception handling thread stores the content of the memory page to the buffer, the memory page is flagged by changing a corresponding bit, of the memory page, in the userfault_bitmap to 1. Certainly, the content of the memory page may also be stored to the buffer after the memory page is flagged. This is not limited herein.

Step S424. The write protection exception handling thread removes write protection on the memory page by invoking the userfaultfd interface such that execution of an action of contaminating the memory page resumes.

Step S425. The write protection exception handling thread ends when receiving an exit notification.

Further, the write protection exception handling thread ends and exits when receiving the exit notification from the snapshot thread.

In the embodiment shown in FIG. 4A and FIG. 4B, the snapshot thread in step S47 performs the following steps.

Step S471. Sequentially obtain an address of a memory page.

Step S472. Determine whether content of the memory page corresponding to the address has been stored to the buffer, and perform steps S473 and S474 if the content of the memory page corresponding to the address has not been stored to the buffer, or perform step S475 if the content of the memory page corresponding to the address has been stored to the buffer.

Further, a corresponding bit, of the memory page, in the userfault_bitmap is searched for. If the corresponding bit, of the memory page, in the userfault_bitmap is 0, it is determined that the memory page has not been flagged, that is, the content of the memory page has not been stored to the buffer. If the corresponding bit is 1, it is determined that the memory page has been flagged, that is, the content of the memory page has been stored to the buffer.

Step S473. Directly store the content of the memory page to the snapshot file of the virtual machine.

Step S474. Remove the write protection on the memory page by invoking the userfaultfd interface.

Step S475. Read the content of the memory page from the buffer, and store the content to the snapshot file of the virtual machine.

Step S476. Determine whether content of memory pages corresponding to all addresses has been stored to the snapshot file, and if the content of the memory pages corresponding to all the addresses has been stored to the snapshot file, instruct the write protection exception handling thread to exit, and end the snapshot thread, or if the content of the memory pages corresponding to all the addresses has not been stored to the snapshot file, repeat steps S471 to S476.

There are multiple methods for determining whether the content of the memory pages corresponding to all the addresses has been stored to the snapshot file. For example, a bitmap may be used to flag a memory page. For example, a variable snapshot_bitmap may be defined, and each bit of the variable corresponds to an address of a memory page of the virtual machine. Further, according to any bit in the variable, an address of a memory page corresponding to the bit may be calculated. If a corresponding bit, of a memory page, in the snapshot_bitmap is 1, it indicates that content of the memory page has not been stored to the snapshot file of the virtual machine. If a corresponding bit, of a memory page, in the snapshot_bitmap is 0, it indicates that content of the memory page has been stored to the snapshot file of the virtual machine. Each time the snapshot thread stores content of a memory page to the snapshot file of the virtual machine, a corresponding bit, of the memory page, in the snapshot_bitmap is changed to 0.

When it is detected that all corresponding bits, of all the memory pages of the virtual machine, in the snapshot_bitmap are 0, it may be determined that the content of the memory pages corresponding to all the addresses has been stored to the snapshot file. If it is detected that not all corresponding bits, of all the memory pages, in the snapshot_bitmap are 0, the foregoing steps are repeated.

Example 2

Guest software and a virtual machine monitor on a virtualization platform can contaminate the memory of the virtual machine. The virtual machine monitor can distinguish, using a code execution path of the virtual machine monitor, whether the virtual machine monitor is to write the memory of the virtual machine. However, during normal running, the virtual machine monitor cannot sense that the guest software is to contaminate the memory of the virtual machine.

Therefore, in Example 2, the virtual machine monitor enables an EPT or NPT write protection function to intercept a contamination action of the guest software on the memory of the virtual machine. Further, after the EPT or NPT write protection function is enabled, the write protection function is used to enable the virtual machine to switch from a guest state to a host state before the guest software contaminates a memory page, and the virtual machine monitor stores, in the host state, content of the memory page to the buffer, flags the memory page as "contamination action intercepted" or "stored to the buffer", and then removes write protection on the memory page such that the guest software can successfully implement the contamination action on the memory page.

For the virtual machine monitor, the virtual machine monitor can determine, using the code execution path, whether the memory of the virtual machine is to be contaminated. Therefore, when the virtual machine monitor determines, according to the code execution path, that the memory of the virtual machine is to be contaminated, the virtual machine monitor determines whether the snapshot file of the virtual machine is being obtained currently. Further, the virtual machine monitor enables a write action track function when receiving the snapshot command. When determining that the write action track function is enabled, the virtual machine monitor may determine that the snapshot file of the virtual machine is being obtained currently.

When the snapshot file of the virtual machine is being obtained currently, and that content of a memory page to be contaminated has not been stored to the buffer, the virtual machine monitor stores the content of the memory page to the buffer, and then contaminates the memory page.

In a process of obtaining the snapshot file of the virtual machine, the virtual machine monitor flags the memory page as "stored to the buffer" when storing the content of the memory page to the buffer. Further, the memory page may be flagged by recording an address of the memory page. Certainly, the above is merely an example, and constitutes no limitation.

For ease of understanding, the following describes the method in Example 2 using a specific embodiment.

Figure 5A:
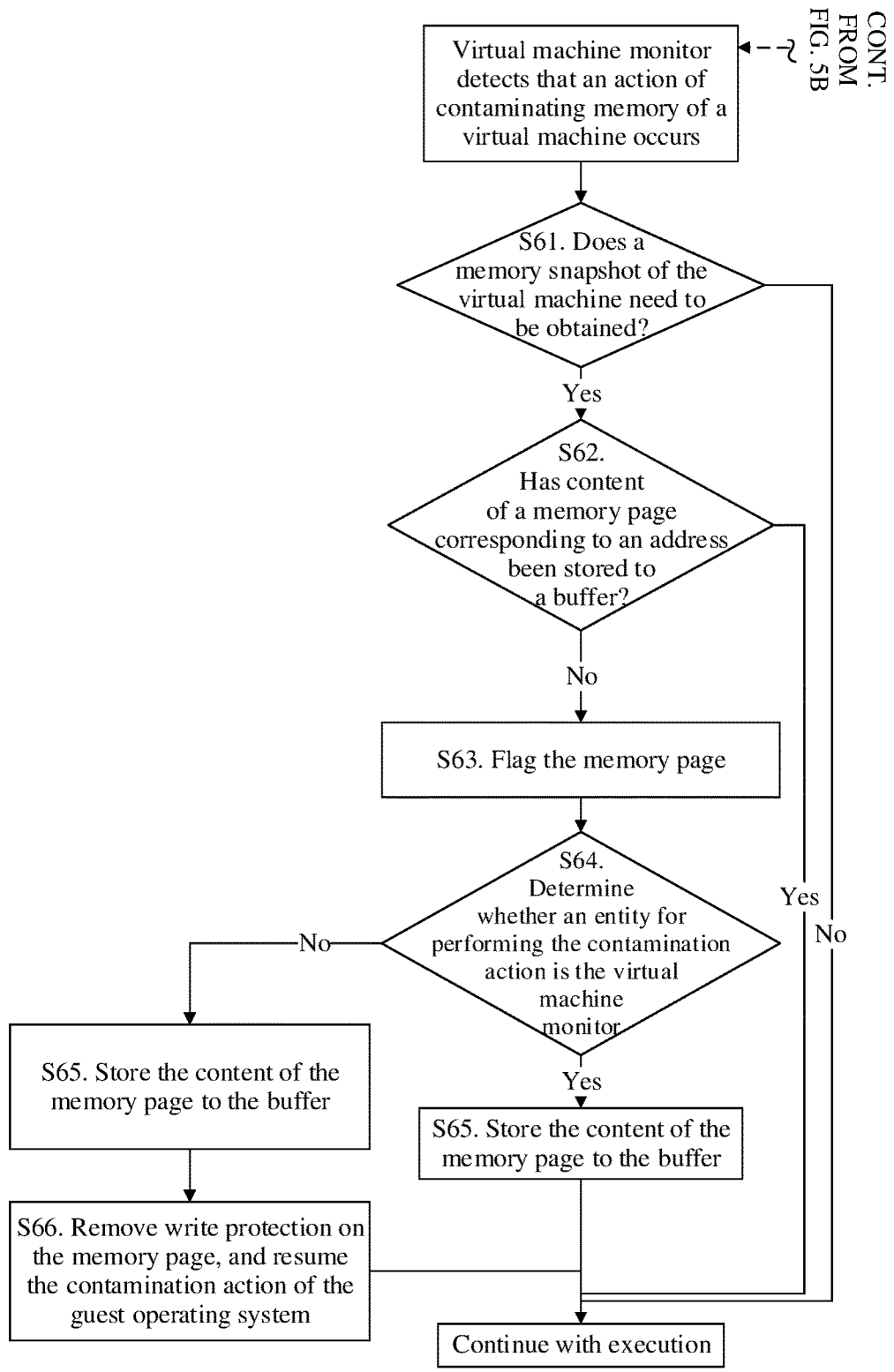
FIG. 5A and FIG. 5B are a schematic flowchart of another embodiment of a method for generating a virtual machine snapshot according to the present disclosure.
Figure 5B:
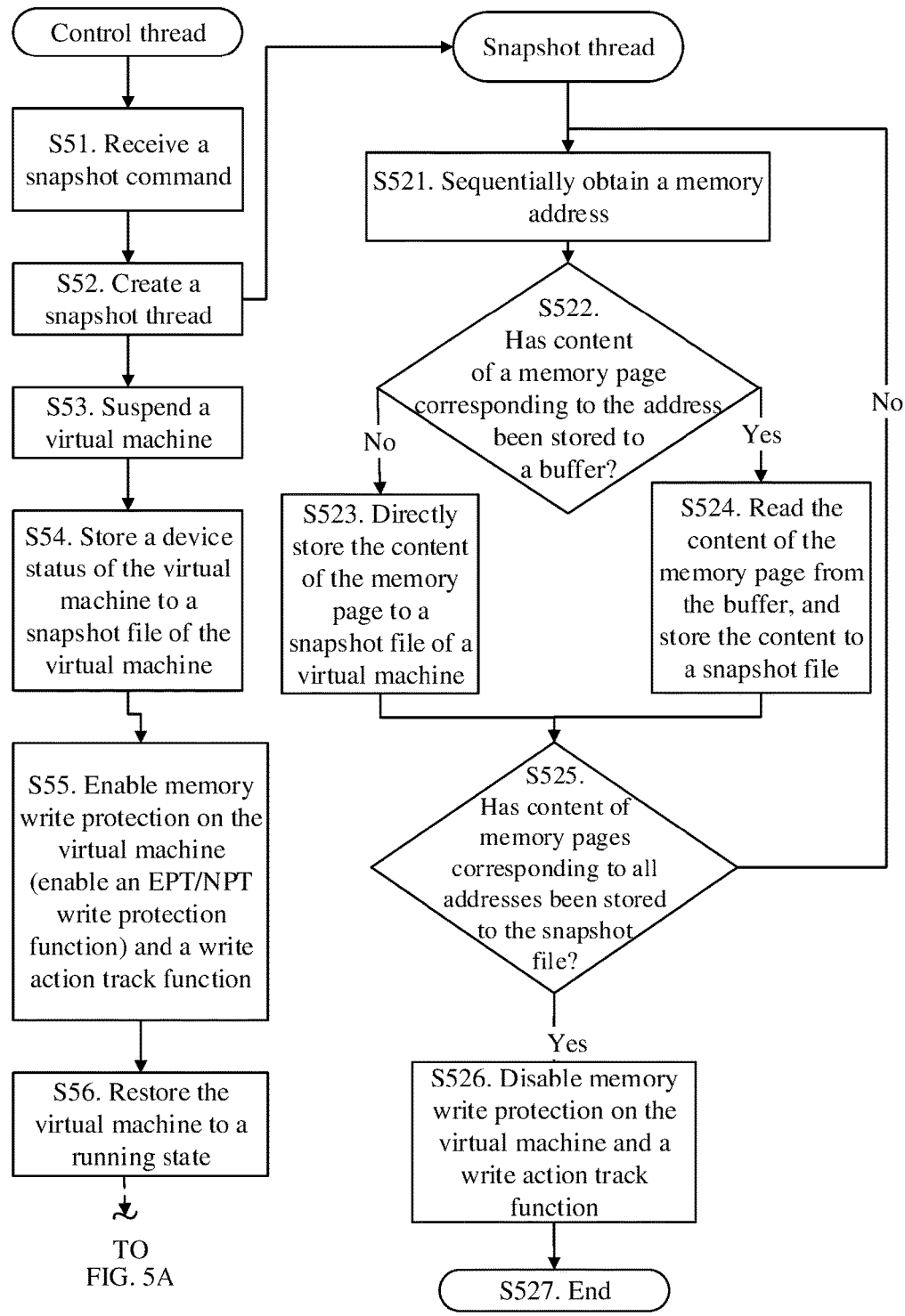

As shown in FIG. 5A and FIG. 5B, FIG. 5A and FIG. 5B are a schematic flowchart of an embodiment of a method for generating a virtual machine snapshot according to the present disclosure.

Step S51. A control thread receives a snapshot command.

In this embodiment, the snapshot command is used to instruct to obtain a snapshot, which is at a first moment, of a virtual machine. Further, the control thread may be a QEMU thread.

Step S52. The control thread creates a snapshot thread.

Step S53. The control thread suspends a virtual machine.

Further, the control thread suspends the virtual machine when receiving the snapshot command.

Step S54. The control thread stores a device status of the virtual machine to a snapshot file of the virtual machine.

Because the virtual machine is suspended at the first moment, the obtained device status of the virtual machine is the same as a device status at the first moment.

Step S55. The control thread enables an EPT or NPT write protection function and a write action track function.

The control thread enables the EPT/NPT write protection function of memory of the virtual machine when receiving a notification indicating that there is a snapshot request. The function enables guest software to exit when the guest software attempts to contaminate a memory page of the virtual machine such that the memory page cannot be contaminated. When the guest software exits, the virtual machine monitor can detect that the guest software is to perform an action of contaminating the memory of the virtual machine.

In addition, the virtual machine monitor may also distinguish, according to a code execution path, whether the memory of the virtual machine is to be written to detect whether the virtual machine monitor is to perform an action of contaminating the memory of the virtual machine. The enabled write action track function can enable the virtual machine monitor to determine that the virtual machine monitor is currently at a stage of obtaining the snapshot file of the virtual machine such that the virtual machine monitor first determines, after detecting that the virtual machine monitor is to perform the action of contaminating the memory of the virtual machine, whether content of a memory page to be contaminated has been stored to the buffer, and then stores the content of the memory page to the buffer if the content of the memory page to be contaminated has not been stored to the buffer.

Step S56. The control thread restores the virtual machine to a running state.

In the virtual machine monitor, after it is detected that the action of contaminating the memory of the virtual machine occurs, the virtual machine monitor performs the following steps.

Step S61. Determine whether a snapshot of memory of the virtual machine needs to be obtained, and perform step S52 to step S66 if the snapshot of the memory of the virtual machine needs to be obtained, or continue to perform an action of contaminating the memory of the virtual machine if the snapshot of the memory of the virtual machine does not need to be obtained.

Further, when it is detected that the EPT or NPT write protection function and the write action track function are enabled, it may be determined that the snapshot file of the virtual machine is being obtained currently. Therefore, step S62 to step S66 are performed. If it is detected that the EPT or NPT write protection function and the write action track function are not enabled, it indicates that the virtual machine monitor is not at the stage of obtaining the snapshot file of the virtual machine, and therefore the action of contaminating the memory of the virtual machine continues to be performed normally.

S62. Determine whether content of a memory page to be contaminated has been stored to a buffer, and perform step S63 if the content of the memory page to be contaminated has not been stored to the buffer, or continue to perform the contamination action if the content of the memory page to be contaminated has been stored to the buffer.

In a process of obtaining the snapshot file of the virtual machine, a same memory page may be contaminated multiple times. Therefore, the virtual machine monitor may flag the memory page when storing content of the memory page to the buffer. In this way, when detecting that the action of contaminating the memory of the virtual machine occurs, the virtual machine monitor determines, before storing the content of the memory page to the buffer, whether the content of the memory page has been stored to the buffer by determining whether the memory page is flagged. If the content of the memory page has been stored to the buffer, the content of the memory page no longer needs to be stored to the buffer, and the contamination action continues to be performed.

Further, a dirty bitmap (dirty_bitmap) is set in the virtual machine monitor, and an address of each memory page of the virtual machine has a corresponding bit in the dirty_bitmap. When an initial value of a corresponding bit, of an address of a memory page, in the dirty bitmap is 0, it indicates that content of the memory page has not been stored to the buffer. The virtual machine monitor changes the corresponding bit, of the address of the memory page, in the dirty bitmap to 1 when storing the content of the memory page to the buffer. In this way, when the virtual machine monitor detects that the corresponding bit, of the address of the memory page, in the dirty bitmap is 1, it indicates that the content of the memory page has been stored to the buffer.

Step S63. Flag the memory page.

Step S64. Determine whether an entity for performing the contamination action is the virtual machine monitor, and perform step S65 if the entity for performing the contamination action is the virtual machine monitor, or perform step S65 and step S66 if the entity for performing the contamination action is not the virtual machine monitor.

When the virtual machine monitor detects the action of contaminating the memory of the virtual machine, the entity for performing the contamination action may be the virtual machine monitor itself, or may be the guest software. If the virtual machine determines that the entity for performing the contamination action is not the virtual machine monitor, it may be determined that the entity is the guest software.

Step S65. Store the content of the memory page to the buffer.

Step S66. Remove write protection on the memory page, and resume the contamination action of guest software.

In the embodiment shown in FIG. 5A and FIG. 5B, the snapshot thread in step S52 performs the following steps.

Step S521. Sequentially obtain an address of a memory page.

Step S522. Determine whether content of the memory page corresponding to the address has been stored to the buffer, and perform step S523 if the content of the memory page corresponding to the address has not been stored to the buffer, or perform step S524 if the content of the memory page corresponding to the address has been stored to the buffer.

Further, a corresponding bit, of the memory page, in the dirty bitmap dirty_bitmap is searched for. If the corresponding bit, of the memory page, in the dirty_bitmap is 0, it is determined that the memory page has not been flagged, that is, the content of the memory page has not been stored to the buffer. If the corresponding bit is 1, it is determined that the memory page has been flagged, that is, the content of the memory page has been stored to the buffer.

Step S523. Directly store the content of the memory page to the snapshot file of the virtual machine.

Step S524. Read the content of the memory page from the buffer, and store the content to the snapshot file of the virtual machine.

Step S525. Determine whether content of memory pages corresponding to all addresses has been stored to the snapshot file, and perform step S526 and step S527 if the content of the memory pages corresponding to all the addresses has been stored to the snapshot file, or perform step S521 to step S525 if the content of the memory pages corresponding to all the addresses has not been stored to the snapshot file.

Step S526. Disable the memory write protection function and the write action track function.

Step S527. End the snapshot thread.

The foregoing describes the method for generating a virtual machine snapshot in the present disclosure, and the following describes an apparatus for generating a virtual machine snapshot in the present disclosure. The apparatus for generating a virtual machine snapshot is configured to perform the foregoing method for generating a virtual machine snapshot.

Figure 6:
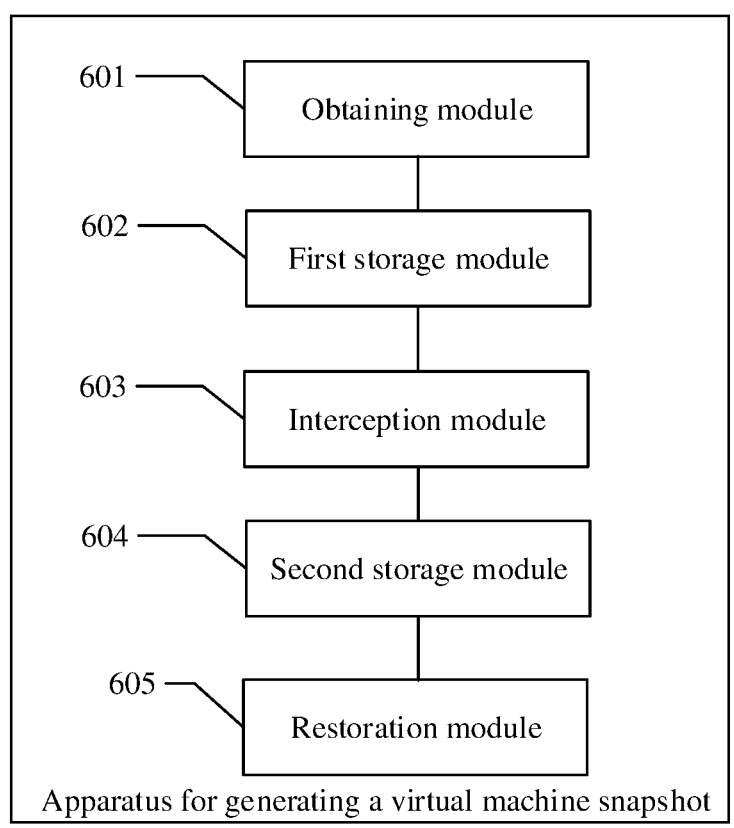
FIG. 6 is a schematic diagram of an embodiment of an apparatus for generating a virtual machine snapshot according to the present disclosure.

Referring to FIG. 6, FIG. 6 is a schematic structural diagram of an embodiment of an apparatus for generating a virtual machine snapshot according to the present disclosure. As shown in FIG. 6, the apparatus for generating a virtual machine snapshot includes an obtaining module 601 configured to suspend a virtual machine at a first moment according to a received snapshot command, where the snapshot command is used to instruct to obtain a snapshot file, which is at the first moment, of the virtual machine, a first storage module 602 configured to start to perform a storage operation on a memory page in memory of the virtual machine from the first moment, an interception module 603 configured to start to perform a contamination interception operation on the memory page in the memory from the first moment, a second storage module 604 configured to store a device status, which is at the first moment, of the virtual machine in a suspended state to the snapshot file of the virtual machine, and a restoration module 605 configured to restore the virtual machine from the suspended state to a running state after the device status is stored.

The interception module 603 is further configured to intercept, from the first moment to a moment at which content of the memory page is stored to the snapshot file of the virtual machine, a contamination action that affects the content of the memory page, and after the content of the memory page is stored to a buffer, release the interception on the contamination action.

The first storage module 602 is further configured to store the content, stored in the buffer, of the memory page to the snapshot file of the virtual machine.

Optionally, before intercepting the contamination action that affects the content of the memory page, the interception module 603 further enables write protection on the memory page using a userfaultfd interface.

Optionally, the interception module 603 is further configured to perform the following operations when storing the content of the memory page to the buffer: creating a write protection exception handling thread, obtaining, by the write protection exception handling thread, a file descriptor using the userfaultfd interface, obtaining, by the write protection exception handling thread, an address of the memory page according to the file descriptor when the contamination action on the memory page is intercepted, obtaining, by the write protection exception handling thread, the content of the memory page according to the address of the memory page, and storing the content to the buffer.

Optionally, the virtual machine includes guest software. The interception module 603 is further configured to enable an EPT or NPT write protection function, where the write protection function is used to enable the virtual machine to switch from a guest state to a host state before the guest software contaminates the memory page, and the interception module 603 is configured to store, in the host state, the content of the memory page to the buffer.

Optionally, the interception module 603 is further configured to perform the following operations of determining, according to a code execution path of the virtual machine monitor, whether the memory of the virtual machine is to be contaminated, when the memory of the virtual machine is to be contaminated, determining, by the virtual machine monitor, whether the snapshot file of the virtual machine is being obtained currently, when the virtual machine monitor determines that the snapshot file of the virtual machine is being obtained currently, determining, by the virtual machine monitor, whether content of a memory page to be contaminated has been stored to the buffer, and storing the content of the memory page to the buffer when the virtual machine monitor determines that the content of the memory page to be contaminated has not been stored to the buffer.

For more detailed descriptions of the apparatus for generating a virtual machine snapshot, refer to the foregoing description of the method for generating a virtual machine snapshot.

The foregoing describes the apparatus for generating a virtual machine snapshot in the present disclosure, and the following describes a virtual machine monitor in the present disclosure.

As shown in FIG. 2, a virtual machine monitor runs on a hardware platform of a computing node in FIG. 2. The virtual machine monitor is configured to mask a hardware difference of a computing platform to provide a user with multiple abstract, unified, and simulated computing environments, that is, multiple virtual machines. The virtual machine monitor simulates, for each virtual machine, a virtual hardware environment independent of real physical hardware. The virtual machine monitor is further configured to generate, in an online manner using the methods according to the embodiments shown in FIG. 3 to FIG. 5A and FIG. 5B, a snapshot file of a virtual machine running on the virtual machine monitor.

It may be clearly understood by persons skilled in the art that, for the purpose of convenient and brief description, for a specific working process of the foregoing system, apparatus, and modules, reference may be made to a corresponding process in the foregoing method embodiments, and details are not repeated herein.

In the embodiments provided in this application, it should be understood that the disclosed system, apparatus, and method may be implemented in other manners. For example, the described apparatus embodiment is merely an example. For example, the unit division is merely logical function division and may be other division in an actual implementation. For example, a plurality of units or components may be combined or integrated into another system, or some features may be ignored or not performed. In addition, the shown or discussed mutual couplings or direct couplings or communication connections may be implemented using some interfaces. The indirect couplings or communication connections between the apparatuses or units may be implemented in electrical, mechanical, or other forms.

The units described as separate parts may or may not be physically separated, and parts shown as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer readable storage medium. Based on such an understanding, the technical solutions of the present disclosure essentially, or the part contributing to the other approaches, or all or some of the technical solutions may be implemented in the form of a software product. The computer software product is stored in a storage medium and includes instructions for instructing a computer device (which may be a personal computer, a server, a network device, or the like) to perform all or some of the steps of the methods described in the embodiments of the present disclosure. The foregoing storage medium includes any medium that can store program code, such as a universal serial bus (USB) flash drive, a removable hard disk, a read-only memory (ROM), a RAM, a magnetic disk, or an optical disc.

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present disclosure.

What is claimed is:

1. A method for generating a virtual machine snapshot, comprising:
    suspending a virtual machine at a first moment according to a received snapshot command;
    starting to perform a contamination interception operation on a memory page in a memory of the virtual machine by:
        intercepting, from the first moment to a moment at which content of the memory page is stored to a snapshot file of the virtual machine, a contamination action affecting the content of the memory page; and
        releasing the interception on the contamination action after storing the content of the memory page to a buffer;
    starting to perform a storage operation on the memory page in the memory of the virtual machine by storing the content, stored in the buffer, of the memory page to the snapshot file of the virtual machine;
    storing a device status, which is at the first moment, of the virtual machine in a suspended state to the snapshot file of the virtual machine; and
    restoring the virtual machine from the suspended state to a running state after the device status is stored.

2. The method of claim 1, wherein before intercepting the contamination action affecting the content of the memory page, the method further comprises enabling write protection on the memory page using a userfaultfd interface.

3. The method of claim 2, wherein storing the content of the memory page to the buffer comprises:
    creating a write protection exception handling thread;
    obtaining, using the write protection exception handling thread, a file descriptor using the userfaultfd interface;
    obtaining, using the write protection exception handling thread, an address of the memory page according to the file descriptor when the contamination action on the memory page is intercepted;
    obtaining, using the write protection exception handling thread, the content of the memory page according to the address of the memory page; and
    storing, using the write protection exception handling thread, the content to the buffer.

4. The method of claim 1, wherein the virtual machine comprises virtual hardware and guest software, the virtual hardware being simulated by a virtual machine monitor, the virtual machine monitor being configured to operate the virtual machine when the virtual machine is in a host state, and performing the contamination interception operation on the memory page comprising:
    enabling an extended page table (EPT) write protection function to enable the virtual machine to switch from a guest state to the host state before the guest software contaminates the memory page; and
    storing the content of the memory page to the buffer when the virtual machine is in the host state.

5. The method of claim 1, wherein the virtual machine comprises virtual hardware and guest software, the virtual hardware being simulated by a virtual machine monitor, the virtual machine monitor being configured to operate the virtual machine when the virtual machine is in a host state, and performing the contamination interception operation on the memory page comprising:
    enabling a nested page table (NPT) write protection function to enable the virtual machine to switch from a guest state to the host state before the guest software contaminates the memory page; and
    storing the content of the memory page to the buffer when the virtual machine is in the host state.

6. The method of claim 4, wherein an entity for performing the memory contamination action on the virtual machine comprises the virtual machine monitor, and performing the contamination interception operation on the memory page further comprising determining, according to a code execution path of the virtual machine monitor, whether the memory of the virtual machine is to be contaminated.

7. The method of claim 5, wherein an entity for performing the memory contamination action on the virtual machine comprises the virtual machine monitor, and performing the contamination interception operation on the memory page further comprising determining, according to a code execution path of the virtual machine monitor, whether the memory of the virtual machine is to be contaminated.

8. A non-transitory computer-readable storage medium storing instructions that when executed by a computer device, cause the computer device to be configured to:
    suspend a virtual machine at a first moment according to a received snapshot command;
    start performing a contamination interception operation on a memory page in a memory of the virtual machine from the first moment by:

intercepting, from the first moment to a moment at which content of the memory page is stored to a snapshot file of the virtual machine, a contamination action affecting the content of the memory page; and releasing the interception on the contamination action after the content of the memory page is stored to a buffer;

start performing a storage operation on the memory page in the memory of the virtual machine from the first moment by storing the content, stored in the buffer, of the memory page to the snapshot file of the virtual machine;

store a device status, which is at the first moment, of the virtual machine in a suspended state to the snapshot file of the virtual machine; and restore the virtual machine from the suspended state to a running state after the device status is stored.

9. The non-transitory computer-readable storage medium of claim 8, wherein the instructions further cause the computer device to be configured to enable write protection on the memory page using a userfaultfd interface before intercepting the contamination action affecting the content of the memory page.

10. The non-transitory computer-readable storage medium of claim 9, wherein when storing the content of the memory page to the buffer, the instructions further cause the computer device to be configured to:

create a write protection exception handling thread;

obtain, using the write protection exception handling thread, a file descriptor using the userfaultfd interface;

obtain, using the write protection exception handling thread, an address of the memory page according to the file descriptor when the contamination action on the memory page is intercepted;

obtain, using the write protection exception handling thread, the content of the memory page according to the address of the memory page; and store, using the write protection exception handling thread, the content to the buffer.

11. The non-transitory computer-readable storage medium of claim 8, wherein the virtual machine comprises guest software, the instructions further causing the computer device to be configured to:

enable an extended page table (EPT) write protection function to enable the virtual machine to switch from a guest state to a host state before the guest software contaminates the memory page; and store the content of the memory page to the buffer when the virtual machine is in the host state.

12. The non-transitory computer-readable storage medium of claim 8, wherein the virtual machine comprises guest software, the instructions further causing the computer device to be configured to:

enable a nested page table (NPT) write protection function to enable the virtual machine to switch from a guest state to a host state before the guest software contaminates the memory page; and store the content of the memory page to the buffer when the virtual machine is in the host state.

13. A computing node, comprising:

a hardware platform; and a virtual machine monitor and a virtual machine run on the hardware platform, the virtual machine monitor being configured to:

suspend the virtual machine at a first moment according to a received snapshot command;

start performing a contamination interception operation on a memory page in a memory of the virtual machine by intercepting, from the first moment to a moment at which content of the memory page is stored to a snapshot file of the virtual machine, a contamination action affecting the content of the memory page; and releasing the interception on the contamination action after storing the content of the memory page to a buffer;

start performing a storage operation on the memory page in the memory of the virtual machine by storing the content, stored in the buffer, of the memory page to the snapshot file of the virtual machine;

store a device status, which is at the first moment, of the virtual machine in a suspended state to the snapshot file of the virtual machine; and restore the virtual machine from the suspended state to a running state after the device status is stored.

14. The computing node of claim 13, wherein the virtual machine monitor is further configured to enable write protection on the memory page using a userfaultfd interface before intercepting the contamination action affecting the content of the memory page.

15. The computing node of claim 14, wherein when storing the content of the memory page, the virtual machine monitor is further configured to:

create a write protection exception handling thread;

obtain, using the write protection exception handling thread, a file descriptor using the userfaultfd interface;

obtain, using the write protection exception handling thread, an address of the memory page according to the file descriptor when the contamination action on the memory page is intercepted;

obtain, using the write protection exception handling thread, the content of the memory page according to the address of the memory page; and storing, using the write protection exception handling thread, the content to the buffer.

16. The computing node of claim 13, wherein the virtual machine comprises virtual hardware and guest software, the virtual hardware being simulated by the virtual machine monitor, and the virtual machine monitor being further configured to:

operate the virtual machine when the virtual machine is in a host state; and perform the following operations when performing the contamination interception operation on the memory page:

enable an extended page table (EPT) write protection function to enable the virtual machine to switch from a guest state to the host state before the guest software contaminates the memory page; and store the content of the memory page to the buffer when the virtual machine is in the host state.

17. The computing node of claim 13, wherein the virtual machine comprises virtual hardware and guest software, the virtual hardware being simulated by the virtual machine monitor, and the virtual machine monitor being further configured to:

operate the virtual machine when the virtual machine is in a host state; and perform the following operations when performing the contamination interception operation on the memory page:

enable a nested page table (NPT) write protection function to enable the virtual machine to switch from a guest state to the host state before the guest software contaminates the memory page; and store the content of the memory page to the buffer when the virtual machine is in the host state.

18. The computing node of claim 13, wherein the virtual machine monitor is further configured to determine, according to a code execution path of the virtual machine monitor, whether the memory of the virtual machine is to be contaminated.

19. The computing node of claim 13, wherein the hardware platform comprises a processor, a memory and a communications interface coupled to each other.

* * * * *